United States Patent Office 3,084,436
Patented Apr. 9, 1963

3,084,436
POLYMERS PREPARED BY POLYMERIZING A MIXTURE OF ESTERS IN THE PRESENCE OF A VINYL STEARATE-VINYL ACETATE COPOLYMER, AND A DENTURE THEREWITH
Lawrence Albert Landry, Chicago, Ill., assignor to Howe Sound Company, a corporation of Delaware
No Drawing. Filed Feb. 25, 1960, Ser. No. 10,885
21 Claims. (Cl. 32—2)

This invention relates to soft and flexible synthetic resinous compositions which are suitable for forming resilient elements of dental and other prosthetic appliances. The new compositions comprise essentially the polymerization product of a mixture of a copolymer of vinyl stearate and vinyl acetate with various acrylates or methacrylates. These compositions are characterized by having a degree of softness and flexibility which suits them eminently for use as cushioning or other resilient components of prosthetic devices. They retain such softness and flexibility indefinitely, and are highly resistant to absorption of water and other tissue fluids. They are for example eminently suited to form resilient liners of dentures, for they not only possess the degree of softness and flexibility necessary for this service, but also are highly resistant to chemical deterioration or to the substantial physical change, dimensionally or otherwise, in consequence of prolonged exposure to mouth fluids.

The invention contemplates the provision not only of the new composition in polymerized form, but also in the form of components packaged together in separate containers for mixing to produce the polymerized product. The method of making the polymerized composition by heating the components together in the presence of a catalyst is also contemplated as a part of the invention, as are prosthetic appliances (dentures in particular) comprising a soft or resilient element made of the polymerized composition.

The synthetic resinous composition of the invention is one in which the resinous constituent is the polymerization product of a mixture comprising (1) from 10 to 100 parts by weight of a copolymer of vinyl stearate and vinyl acetate, wherein the vinyl stearate moiety constitutes 15% to 50% by weight of the copolymer, (2) from ½ to 90 parts by weight of a monofunctional ester of the group consisting of acrylates and methacrylates of alcohols of the group consisting of aliphatic alcohols containing 1 to 18 carbon atoms, aryl-substituted aliphatic alcohols containing 1 to 2 carbon atoms in the alkyl moiety cyclohexanol and pentamethyldisiloxanemethanol, and (3) from ½ to 40 parts by weight of a polyfunctional ester of the group consisting of polyacrylic esters and polymethacrylic esters of polyhydroxy aliphatic alcohols containing 2 to 8 carbon atoms and polyacrylic esters and polymethacrylic esters of polyglycols. (The terms "monofunctional" and "polyfunctional" as used herein refer to the number of double bonds in the monomer available for polymerization reaction. Thus "polyfunctional" refers to esters having two or more such double bonds.)

The polymerized composition of the invention is formed by heating together the components set forth above in the presence of a catalyst. Free radical catalysts (compounds which upon heating to the polymerization temperature serve as generators of free radicals) are particularly contemplated as polymerization catalysts. High energy ionizing radiations function similarly to such compounds and may be used in their stead. Other catalysts which promote polymerization of acrylates and metharylates may also be used with success.

It is a particular feature of the invention that the solid and liquid components of the composition may be packaged together in separate containers so that upon mixing them together in the presence of a catalyst in contact with a prosthetic appliance or other device, the polymerized product may be formed in situ as a resilient element of such appliance or other device. The copolymer of vinyl stearate and vinyl acetate, together with other solid constituents to be incorporated in the polymerized composition, forms the contents of one of the containers in such package, and the acrylate or methacrylate monomers and other liquid components entering the formulation of the polymerized product constitute the contents of the other container in the package.

Prosthetic appliances made in accordance with the invention comprise a resilient element made of the polymerized compositions described above. In particular, the invention contemplates dentures having a soft lining comprising such polymerized composition. In the case of dentures, the soft lining may be formed as an integral part of the denture as originally produced, or it may be applied as a reliner to a previously formed denture. Denture soft liners in accordance wtih the invention serve effectively for such purposes as to cushion bony or nervous areas and thereby relieve the denture wearer from discomfort, to aid in retention of the denture in place and to improve its seal to the mouth tissues by improving adaptation of the denture to the palate, and to relieve extreme undercut areas and thereby facilitate insertion and removal of the appliance. They may also be employed where it is necessary to cover protuberances in the mouth, such as a malformed torus palatinus.

The use of the new composition is not however limited to dentures. It may be used for a wide variety of prosthetic applications. It may for example be employed for the replacement of cartilaginous tissues or organs not present because of congenital disorders or lost through disease or accident, such, for example, as an ear or obturator. Indeed, it may be employed wherever a soft and flexible prosthetic device or component of such device is desired; and it may, of course, be used for a multitude of non-prosthetic purposes.

As stated above, the soft and flexible polymerized resinous composition of the invention is prepared by subjecting to polymerization a mixture comprising a copolymer of vinyl stearate and vinyl acetate, a monofunctional ester of acrylic or methacrylic acid, and a polyfunctional acrylic or methacrylic ester. The copolymer is a solid material, and the esters are essentially monomeric liquids. The composition is most conveniently prepared by mixing the solid and liquid constituents in desired proportions, allowing the mixture to stand with or without working it until the components are thoroughly blended, molding it to the desired shape, and curing it with the aid of a polymerization catalyst. Often it will be desirable to incorporate non-resinous components in the composition; and this ordinarily is best accomplished by blending such components with either the solid or liquid materials prior to the final mixing and curing (polymerization) operations.

The copolymer of vinyl stearate and vinyl acetate which forms the chief solid constituent from which the composition is prepared should be one in which the vinyl stearate moiety constitutes 15% to 50% by weight of the copolymer. Optimum compositions ordinarily are prepared from copolymers in which the vinyl stearate moiety amounts to about 30% by weight of the copolymer, the vinyl acetate moiety constituting the balance. If the vinyl stearate moiety is substantially less than 15% by weight of the copolymer, it yields compositions which are undesirably hard; while copolymers in which the vinyl stearate moiety substantially exceeds 50% yield compositions which are undesirably waxy and brittle at room temperature, although very soft and weak at slightly elevated temperatures. The copolymer of 30% vinyl stearate and 70% vinyl acetate yields compositions in which an excellent degree of softness and flexibility at ordinary temperatures is combined with good mechanical strength and toughness.

As previously indicated, the monofunctional ester (or mixture of esters) employed in making the new composition is an acrylate or methacrylate of an alcohol of the group consisting of aliphatic alcohols containing 1 to 18 carbon atoms, aryl-substituted aliphatic alcohols containing 1 to 2 carbon atoms in the alkyl moiety, cyclohexanol, and pentamethyldisiloxanemethanol. Such ester is employed in the liquid essentially in monomeric form.

Following is a list of methacrylic esters which have been employed with success as the monofunctional ester component of the new composition:

Pentamethyldisiloxanemethyl methacrylate
Methyl methacrylate
Ethyl methacrylate
n-Butyl methacrylate
Isobutyl methacrylate
Sec-butyl methacrylate
Tert-butyl methacrylate
Isoamyl methacrylate
2-ethyl-butyl methacrylate
n-Hexyl methacrylate
Cyclohexyl methacrylate
"Octyl-decyl" methacrylate
Lauryl methacrylate
Stearyl methacrylate
Benzyl methacrylate Corresponding acrylic acid esters may also be employed.

The polyfunctional ester used in making the composition likewise is an acrylic or methacrylic acid ester, but one in which the alcoholic constituent is a polyhydroxy aliphatic alcohol containing 2 to 8 carbon atoms or a polygylcol. It too is employed in liquid, essentially monomeric form in preparing the new composition. Following is a list of di- and trimethacrylates which have been used successfully as polyfunctional esters in compositions according to the invention:

Ethyleneglycol dimethacrylate
Tetraethyleneglycol dimethacrylate
Tetramethylene dimethacrylate
1,2,6-hexanetriol dimethacrylate
Propyleneglycol dimethacrylate
1,2,6-hexanetriol trimethacrylate
Neopentylglycol dimethacrylate
Glycerol dimethacrylate
Glycerol trimethacrylate
Trimethylolpropane dimethacrylate
Trimethylolpropane trimethacrylate Corresponding di- and triacrylates, and esters containing four or more acrylic or methacrylic moieties, of alcohols containing four or more hydroxy groups, may also be employed with success.

Satisfactory compositions for various prosthetic uses may be prepared from compositions in which the proportions of copolymer to monofunctional and polyfunctional esters extend throughout the entire broad range of proportions indicated above. With a substantial maximum proportion of copolymer and a substantially minimum proportion of monomeric esters, giving a composition in which the copolymer amounts to 95% or more of the resinous constituent, the mixture prior to curing is stiff and somewhat difficult to work, but may sometimes be used with advantage in the form of a stiff dough, or as preformed sheets or blanks which may or may not be precured and used as a moldable thermoplastic. At the other extreme, when the monomeric esters are used in near maximum amounts and the copolymer in a near minimum amount, the composition is a thin fluid which can be employed with success by casting techniques. For most molding purposes, using the techniques commonly employed in the fabrication of dentures, the proportions of solid copolymer to monofunctional and polyfunctional esters should be such as to yield a composition which prior to curing is easy to work and pack in the denture mold. For such purposes, the copolymer preferably comprises 40 to 80 parts by weight of the composition, and the total of the monofunctional and polyfunctional esters totals 20 to 60 parts by weight of the composition.

In general, the proportion of monofunctional ester in the composition will be considerably higher than the proportion of polyfunctional ester. The hardness of compositions according to the invention tends to increase with increasing proportion of the polyfunctional relative to monofunctional ester; and of course excessive hardness is to be avoided. On the other hand, extremely low concentrations of the polyfunctional ester is likely to result in compositions having inadequate hardness and inadequate resistance to water absorption, especially when the proportion of monofunctional ester to copolymer is high. The most generally useful ranges of concentrations are from 2 to 10 parts by weight of the polyfunctional ester, from 15 to 50 parts by weight of the monofunctional ester, and from 40 to 80 parts by weight of the copolymer.

In addition to the copolymer and to the essentially monomeric acrylic or methacrylic esters, a catalyst generally is incorporated in the composition preparatory to curing. Additionally, other ingredients such as pigments frequently are desired. While these various substances may be incorporated at the time the copolymer and the monomers are mixed together, it is generally preferable to premix the solid and liquid components separately, and to prepare the final composition for curing by intermixing the resulting solid and liquid materials. For example, a powder premix may be prepared containing the copolymer, the pigment, and such other solid ingredients as are desired; and a liquid premix may be prepared by mixing together the monofunctional and polyfunctional esters and such other components as may conveniently be incorporated with them. Thereafter, the final composition is prepared by mixing the powder and the liquid premixes in suitable proportions, and then curing the resulting mixture.

It is particularly advantageous to prepare such premixes for distribution to dental mechanics and other artisans who use the composition in the formation of dentures and other prosthetic appliances. The components in such a package have a long shelf life, yet are quickly mixed, molded and cured to form the polymerized composition of the invention as an element of a prosthetic device or for any other purpose.

The copolymer of vinyl stearate and vinyl acetate, containing, as noted above, from 15% to 50% by weight of the vinyl stearate moiety, generally has a molecular weight within the range from 100,000 to 200,000. Preferably it is in rather finely granular powder form, substantially all minus 20-mesh (U.S. standard). Coarser granules require relatively long periods of time for effective mixing with the acrylic or methacrylic monomers. Copolymer particles much finer than minus 20-mesh have the advantage of quickly blending with or dissolving in the liquid monomers, but the copolymer in very fine particle sizes is likely to be rather costly.

The copolymer powder tends to agglomerate. To impart free flowing characteristics to it, it is advantageously blended with a very small quantity of an anti-agglomerant such as colloidal silica, calcium stearate, or the like. For example, simple dry blending of the minus 20-mesh copolymer powder with 0.02% to 0.1%, and preferably about 0.05%, of silica of colloidal fineness (particle size about 0.02 micron) renders it free flowing at all ordinary temperatures.

If it is desired to produce a colored or tinted polymerized composition, or to increase its opacity, a pigment may with advantage be blended with the copolymer powder. Generally only a very small amount of pigment will be used, in order not to adversely affect the softness and flexibility of the polymerized product. For purposes of producing a composition tinted suitably for denture use, for example, from 0.05% to 0.2% of a red pigment, and from 0.1% to 0.4% (these percentages being by weight of the copolymer) of an opacifying pigment such as titanium dioxide, may be dry blended with the copolymer.

Ordinarily it is desirable also to blend the catalyst by which the composition is polymerized with the copolymer powder. As noted above, a catalyst which upon heating generates free radicals in the reaction mixture is a particularly satisfactory catalyst to employ. For this purpose, a peroxide such as benzoyl peroxide, or a diperoxide, or a hydroperoxide, or an azo compound such as $\alpha,\alpha'$-azo-di-iso-butyronitrile, may be used. Other catalysts employed for polymerizing acrylic monomers may also be used with success. The amount of catalyst blended with the copolymer is determined mainly by the proportions of acrylic and methacrylic ester monomers to be mixed with it. Ordinarily from 0.5 to 2 parts are employed per 100 parts of liquid monomers. However, the amount of catalyst may be outside this range if desired.

Following is an example of a powdery blend of solids which is eminently suitable for packaging together with (but in a separate container from) the mixture of liquid monomers for the purpose of distributing the components of the new composition to dental mechanics and like users:

| | Parts by weight |
|---|---|
| Copolymer of vinyl stearate and vinyl acetate (30% vinyl stearate moiety, molecular weight between 100,000 and 200,000, minus 20-mesh) | 100 |
| Colloidal silica (nominally 0.02 micron particle size) | 0.1 |
| Red pigment (minus 325-mesh) | 0.12 |
| Titanium dioxide (minus 325-mesh) | 0.2 |
| Benzoyl peroxide catalyst | 1.0 |

These ingredients when intimately dry blended form a free flowing powder, pink in color to the naked eye, having a bulk density of about 0.64 gram per cc.

The liquid components of the composition are simply mixed together. Both the monofunctional and polyfunctional acrylate and methacrylate monomers which enter into the resinous composition of the invention are liquids at normal temperatures, and are readily miscible with each other. They are of course mixed in proportions conforming to the desired final polymer composition.

Of the various monofunctional esters that may be employed, the methacrylic ester of pentamethyldisiloxanemethanol is especially satisfactory. It is a water-white liquid having low viscosity, low volatility, and a specific gravity of about 0.9 gram per ml. at 25° C. It imparts a high degree of resistance to moisture absorption to the final composition. However, other methacrylates of aliphatic alcohols containing 1 to 18 carbon atoms, of aryl-substituted methanol and ethanol, and of cyclohexanol, including all those listed above, and corresponding acrylates, may partially or completely replace pentamethyldisiloxanemethyl methacrylate.

Ethyleneglycol dimethacrylate is a particularly satisfactory polyfunctional ester for use in making the new composition. It is readily available in a high purity grade. It is a water-white liquid having low viscosity and low volatility and a specific gravity at 25° C. only slightly greater than water. However, any of the polymethacrylic esters of polyhydroxy aliphatic alcohols containing 2 to 8 carbon atoms and of polyglycols, including all those listed above, and corresponding polyacrylic esters, may be used.

In order to minimize the risk that the mixture of monofunctional and polyfunctional esters will undergo some degree of spontaneous polymerization if held for a prolonged period prior to use. a polymerization inhibitor may be mixed in low concentration with them. For example, hydroquinone in a concentration in the range from 20 to 100 parts per million, or a similar low concentration of the monomethylether of hydroquinone may be mixed with the liquid monomers. These low concentrations of polymerization inhibitors do not interfere with satisfactory curing of the composition in the presence of normal concentrations of the polymerization catalyst, but they are effective to insure a long shelf life, free from any substantial spontaneous polymerization, of the liquid mixture of monomers.

The liquid mixture may also include ingredients for modifying its physical and handling properties. For example, for some applications it is desirable to add a thickener, so as to reduce the tendency of the liquid to run. This may be accomplished by incorporating a small amount of any compatible thickening agent. Preferably, however, such thickening is accomplished by dissolving in the mixture of liquid monomers a small amount of the vinyl stearate-vinyl acetate copolymer. Thus copolymer, in the amount of 10% by weight of the monomers, dissolved in the monomers produces a liquid of syrupy consistency.

Following is an example of a mixture of monomers having a long shelf life which is suitable for packaging together with the solid copolymer, but in a separate container, for commercial distribution of the components of the new composition:

| | |
|---|---|
| Pentamethyldisiloxanemethyl methacrylate | 92 parts by weight. |
| Ethyleneglycol dimethacrylate | 8 parts by weight. |
| Hydroquinone | 0.005 part by weight. |
| Dissolved vinyl stearate-vinyl acetate copolymer | As required to impart desired viscosity. |

The new soft and flexible polymerized composition is prepared by suitably mixing together the solid copolymer and the liquid monomers in the presence of a catalyst, and heating or otherwise activating the catalyst to promote polymerization. The mechanism of curing involves polymerization of the liquid monofunctional and polyfunctional esters through their double bonds by the action of the catalyst. The monofunctional ester or esters cure to essentially linear polymers of high molecular weight. The polyfunctional ester or esters polymerize together and copolymerize with the monofunctional compounds to yield a three-dimensional cross-linked polymer. Although the vinyl stearate-vinyl acetate copolymer is essential to secure the desired soft and flexible characteristics of the polymerized product, it is not known whether this copolymer becomes chemically bound to the polymer of monofunctional and polyfunctional esters. It is possible that free radical catalysts induce some cross linking between the vinyl stearate-vinyl acetate copolymer and the polymers and copolymers of the monofunctional and polyfunctional esters; but it is also possible that the final cured product may be only a solid solution of one of these copolymers within the other.

It is generally most convenient to effect polymerization by means of a free radical catalyst (that is, a catalyst which may be activated to liberate free radicals within the rection mixture), such, for example, as peroxides, hydroperoxides, and azo compounds which break down upon heating with the liberation of free radicals. Preferred catalysts are those which are activated by heating to a temperature below or not much above 100° C., but others may be used provided the activation temperature is not so high as to cause substantial volatilization of any of the ingredients. In some cases it is desirable to activate the catalyst chemically, at or near room temperature. For example, benzoyl peroxide catalyst may be activated at room temperature by reaction with N,N-dimethyl-p-toluidine. When the catalyst thus is to be chemically activated, the activator may be premixed with the mixture of liquid monomers (the catalyst being premixed with the dry solid copolymer blend). Upon blending together the solid and liquid premixes, curing is effected without heating.

In preparing the polymerized composition of the invention from the solid and liquid premixes described above, the solid copolymer blend may be sprinkled into a container of, or on to a surface wetted by, the liquid monomers, or the liquid may be carefully poured over or sprinkled on the powder to wet it thoroughly. In either case, the mixture of solid and liquid is allowed to interact for a short time during which the powder swells as it imbibes the liquid and forms a very tacky mass. This mass may be packed into the mold in which it is to be cured, and therein may be heated as required to activate the catalyst. In a typical case, using benzoyl peroxide as the catalyst, a curing time of 90 minutes at 75° C., followed by heating to about 100° C. for 30 minutes, results in a substantially complete cure and the formation of the tough, but soft and flexible polymerized composition of the invention.

Other techniques for mixing the powder and liquid, and for applying the polymerized composition to prosthetic and other devices, are of course available and may be used. In place of mixing all the powder and liquid together at once, portions of powder and liquid may be applied alternately to the surface on which the composition is to be cured. When the portion of liquids to solids is relatively high (e.g. when less than 30% by weight of the composition is composed of copolymer), the swelled mass forms a more or less viscous solution which may be poured into a mold or against the surface to which it is to be applied. In some cases the powder and liquid may be blended together and precured in the form of a sheet, rod, or the like. Some such precured products have some degree of thermoplasticity and may be molded in contact with a prosthetic or other appliance of which it is to form a soft, flexible element.

A denture having a soft liner of the new composition may be made with but slight modifications of the conventional techniques. For this purpose a plaster model in a dental flask is prepared, and the waxed up denture is invested in the mating half of the flask. Spacers are applied to the model where the soft liner is desired. Conventional denture base plastic composition is then packed in place and the flask is closed to mold it to shape. Depressions are thus formed in the packed plastic where the spacers were applied to the model. The molded plastic is separated from the model, the spacers are removed, and the model is foiled (sealed) in the usual manner. The areas on the model which are to be soft lined are wetted with the liquid component of the composition (e.g. the liquid of the example given above). Then the solid component (e.g. the dry blended copolymer composition of the above example) is sprinkled in a thin layer on the liquid. Alternate applications of liquid and powder are sprinkled on until the entire area to be soft lined is covered and the desired thickness is achieved. This should be somewhat in excess of minimum requirements, to allow squeezing out excess and insure complete filling of the mold. Finally, the entire surface is wetted with liquid until no more is absorbed.

The mixture of solid and liquid on the model is allowed to swell out for 10 minutes or so, and the mass may then be smoothed and "densified" with the finger or a suitable tool, which preferably is covered with wet cellophane to prevent sticking to the composition. The flask is then closed and placed under pressure for, say, half an hour. The composition is then heated in the mold to the curing temperature to cure both the denture base plastic and the soft liner simultaneously in contact with one another. In the finished denture the soft liner adheres well to the conventional denture base plastic composition.

An old denture may be relined with the new soft and flexible composition by a generally similar technique, after burring out the areas of the denture which are to receive the soft liner. When the denture base plastic is an acrylic or methacrylic resin composition (as is usually the case) it is desirable to paint the areas which are to receive the soft liner with methyl methacrylate to promote adhesion of the soft liner composition.

The following Table I sets forth a number of examples of compositions according to this invention, including data regarding hardness (as measured with a Shore "A" durometer) and the increase in weight which occurs as a result of boiling in water for a period of ten days. Compositions for the use as denture components preferably should have a Shore "A" durometer hardness @ 37° C. (body temperature) between 20 and 80, and should absorb not more than 10% by weight of water. The abbreviations used in the body of Table I are explained in the "notes" following the table.

*Table I*

| Example No. | Powder Composition | | Liquid Composition | | Shore "A" Hardness at 37° C. | Boiling Water, Percent Weight Increase |
|---|---|---|---|---|---|---|
| | Parts by Weight | Compound | Parts by Weight | Monomer | | |
| 1 | 82.5<br>0.2 | 30/70<br>BPO | 2.5<br>15 | PDMM<br>EDM | 60 | 3.2 |
| 2 | 55<br>0.5 | 30/70<br>BPO | 43<br>2 | PDMM<br>EDM | 37 | 7.4 |
| 3 | 50<br>0.1<br>0.06<br>0.1<br>0.5 | 30/70<br>SiO₂<br>Red Pigment<br>TiO₂<br>BPO | 46<br>4 | PDMM<br>EDM | 48 | 4.0 |
| 4 | 25<br>0.8 | 30/70<br>BPO | 70<br>5 | PDMM<br>EDM | 71 | 0.2 |
| 5 | 66.7<br>0.33 | 30/70<br>BPO | 25<br>8.3 | PDMM<br>TEDM | 31 | 2.8 |
| 6 | 66.7<br>0.33 | 30/70<br>BPO | 20<br>13.3 | PDMM<br>TMDM | 67 | 3.3 |
| 7 | 66.7<br>0.33 | 30/70<br>BPO | 25<br>8.3 | PDMM<br>NPDM | 43 | 6.4 |
| 8 | 55<br>0.5 | 15/85<br>BPO | 40<br>5 | PDMM<br>EDM | 38 | 4.9 |
| 9 | 70<br>0.3 | 50/50<br>BPO | 20<br>10 | PDMM<br>EDM | 32 | 1.7 |
| 10 | 80<br>0.2 | 30/70<br>BPO | 5<br>15 | MMA<br>NPDM | 39 | low |
| 11 | 70<br>0.3 | 30/70<br>BPO | 25<br>5 | BMA<br>EDM | 54 | low |
| 12 | 70<br>0.3 | 30/70<br>BPO | 20<br>10 | HMA<br>EDM | 61 | low |
| 13 | 70<br>0.3 | 30/70<br>BPO | 15<br>15 | ODMA<br>EDM | 70 | low |
| 14 | 70<br>0.3 | 30/70<br>BPO | 25<br>5 | SMA<br>EDM | 23 | low |
| 15 | 66.7<br>0.33 | 30/70<br>BPO | 15<br>15<br>3.3 | PDMM<br>IBMA<br>TEDM | 34 | 2.9 |
| 16 | 66.7<br>0.33 | 30/70<br>BPO | 15<br>15<br>3.3 | PDMM<br>CHMA<br>TEDM | 30 | 8.5 |
| 17 | 66.7<br>0.33 | 30/70<br>BPO | 15<br>15<br>3.3 | PDMM<br>BZMA<br>TEDM | 32 | 7.2 |

Notes to table:
30/70=30% vinyl stearate, 70% vinyl acetate copolymer.
15/85=15% vinyl stearate, 85% vinyl acetate copolymer.
50/50=50% vinyl stearate, 50% vinyl acetate copolymer.
BPO=Benzoyl peroxide.
PDMM=Pentamethyldisiloxanomethyl methacrylate.
EDM=Ethyleneglycol dimethacrylate.
TEDM=Tetraethyleneglycol dimethacrylate.
TMDM=Tetramethylene dimethacrylate.
NPDM=Neopentylglycol dimethacrylate.
MMA=Methyl methacrylate.
BMA=n-Butyl methacrylate.
HMA=n-Hexyl methacrylate.
ODMA=Octyl-decyl methacrylate.
SMA=Stearyl methacrylate.
IBMA=Isobutyl methacrylate.
CHMA=Cyclohexyl methacrylate.
BZMA=Benzyl methacrylate.
SiO₂=Colloidal silica.

Other examples of the invention are set forth below (the same abbreviations employed in the foregoing table are used in the following examples to identify ingredients of the composition, and all parts are by weight):

Example 18 (Room Temperature Cure)

The following powder and liquid mixtures were prepared.

Powder: Parts
30/70 _____ 50
BPO _____ 0.5
Liquid:
PDMM _____ 46
EDM _____ 4
N,N-dimethyl-p-toluidine _____ 0.25

This powder and liquid were blended together, pressed into a gypsum mold, and allowed to stand at room temperature overnight. Upon opening, a clear, slightly yellow polymerized bar was removed from the mold. The bar had good mechanical strength, a Shore "A" hardness at 37° C. of 53 and good resistance to boiling water.

Example 19 (Liquid Having Long Shelf Life)

The following powder and liquid mixtures were prepared.

Powder: Parts
30/70 _____ 50
BPO _____ 0.5
Liquid:
PDMM _____ 46
EDM _____ 4
Hydroquinone _____ 0.005

The powder and liquid were blended together, molded in a dental flask, and cured therein by heating to about 75° C. for 90 minutes, after which the temperature was raised to about 100° C. for 30 minutes. After cooling and removing the cured product from the mold, it was found to have a Shore "A" hardness at 37° C. of 53 and low absorption of water. The liquid mixture was stored at 70° C. for a period of one month without showing any evidence of polymerizing.

Example 20 (Precured Sheet)

The following mixtures were prepared:

Parts
30/70 _____ 97.5
BPO _____ 0.1
Liquid:
PDMM _____ 1.25
EDM _____ 1.25

The powder and liquid were blended together, and cured in a gypsum mold in sheet form. The cured sheet had a Shore "A" hardness at 37° C. of 26, and low water absorption. The sheet was caused to conform to a portion of a denture model, and a denture of conventional acrylic denture resin dough was pressed against it, molded, and cured in the usual manner. The resulting denture was of hard acrylic resin with a thin soft liner formed of the precured sheet bonded strongly thereto.

Example 22 (Casting Mixture)

The following mixture was prepared:

Parts
30/70 _____ 20
PDMM _____ 75
EDM _____ 5

This mixture was warmed slightly, forming a clear solution having the consistency of a thin syrup. Into it was mixed 0.8 part BPO, and the solution was then cast into a gypsum mold, wherein it was cured in sheet form. The cured sheet was soft and flexible, having good resistance to water absorption, and was well suited to serve as the soft liner of a denture.

I claim:
1. A synthetic resinous composition suitable for forming a soft and flexible element of a prosthetic appliance, in which the resinous constituent is the polymerization product of a mixture comprising (1) from 10 to 100 parts by weight of a copolymer of vinyl stearate and vinyl acetate wherein the vinyl stearate moiety constitutes 15% to 50% by weight of the copolymer, (2) from ½ to 90 parts by weight of a monofunctional ester of the group consisting of acrylates and methacrylates of alcohols of the group consisting of aliphatic alcohols containing 1 to 18 carbon atoms, aryl-substituted aliphatic alcohols containing 1 to 2 carbon atoms in the alkyl moiety, cyclohexanol, and pentamethyldisiloxanemethanol, and (3) from ½ to 40 parts by weight of a polyfunctional ester of the group consisting of polyacrylic esters and polymethacrylic esters of polyhydroxy aliphatic alcohols containing 2 to 8 carbon atoms and polyacrylic esters and polymethacrylic esters of polyglycols.

2. A composition according to claim 1, in which the vinyl stearate moiety of the copolymer constitutes about 30% by weight thereof.

3. A composition according to claim 1, in which the monofunctional ester is pentamethyldisiloxanemethyl methacrylate.

4. A composition according to claim 1, in which the polyfunctional ester is ethyleneglycol dimethacrylate.

5. A synthetic resinous composition suitable for forming a soft and flexible element of a prosthetic appliance in which the resinous composition is the free radical polymerization product of a mixture comprising (1) from 10 to 100 parts by weight of a copolymer of vinyl stearate and vinyl acetate wherein the vinyl stearate moiety constitutes 15% to 50% by weight of the copolymer, (2) ½ to 90 parts by weight of pentamethyldisiloxanemethyl methacrylate, and (3) ½ to 40 parts by weight of ethylene glycol dimethacrylate.

6. A synthetic resinous composition suitable for forming a soft and flexible element of prosthetic appliance in which the resinous composition is the free radical polymerization product of a mixture comprising (1) from 40 to 80 parts by weight of a copolymer of vinyl stearate and vinyl acetate wherein the vinyl stearate moiety constitutes 15% to 50% by weight of the copolymer, (2) 15 to 60 parts by weight of pentamethyldisiloxanemethyl methacrylate, and (3) ½ to 10 parts by weight of ethyleneglycol dimethacrylate.

7. A synthetic resinous composition suitable for forming a soft and flexible element of a prosthetic appliance in which the resinous composition is the free radical polymerization product of a mixture comprising (1) from 40 to 80 parts by weight of a copolymer of vinyl stearate and vinyl acetate wherein the vinyl stearate moiety constitutes about 30% by weight of the copolymer, (2) 15 to 60 parts by weight of pentamethyldisiloxanemethyl methacrylate, and (3) 2 to 10 parts by weight of ethyleneglycol dimethacrylate.

8. The method of making a synthetic resinous composition suitable for forming a soft and flexible element of a prosthetic appliance which comprises heating together in the presence of a polymerization catalyst a mixture comprising (1) from 10 to 100 parts by weight of a copolymer of vinyl stearate and vinyl acetate wherein the vinyl stearate moiety constitutes 15% to 50% by weight of the copolymer, (2) from ½ to 90 parts by weight of a monofunctional ester of the group consisting of acrylates and methacrylates of alcohols of the group consisting of aliphatic alcohols containing 1 to 18 carbon atoms, aryl-substituted aliphatic alcohols containing 1 to 2 carbon atoms in the alkyl moiety, cyclohexanol, and pentamethyldisiloxanemethanol, and (3) from ½ to 40 parts by weight of a polyfunctional ester of the group consisting of polyacrylic esters and polymethacrylic esters of polyhydroxy aliphatic alcohols containing 2 to 8 carbon atoms and polyacrylic esters and polymethacrylic esters of polyglycols.

9. The method of making a synthetic resinous composition suitable for forming a soft and flexible element of a prosthetic appliance which comprises heating together in the presence of a free radical catalyst selected from the group consisting of peroxides and azo compounds a mixture comprising (1) from 10 to 100 parts by weight of a copolymer of vinyl stearate and vinyl acetate wherein the vinyl stearate moiety constitutes 15% to 50% by weight of the copolymer, (2) ½ to 90 parts by weight of pentamethyldisiloxanemethyl methacrylate, and (3) ½ to 40 parts by weight of ethyleneglycol dimethacrylate.

10. A preparation comprising solid and liquid components packaged together in separate containers and capable upon mixing of reacting in the presence of a source of free radicals to form a resinous composition suitable for forming a soft and flexible element of a prosthetic appliance, said solid component comprising from 10 to 100 parts by weight of a finely granular copolymer of vinyl stearate and vinyl acetate wherein the vinyl stearate moiety constitutes 15% to 50% by weight of the copolymer, and said liquid component being a solution containing from ½ to 90 parts by weight of a monofunctional ester of the group consisting of acrylates and methacrylates of alcohols of the group consisting of aliphatic alcohols containing 1 to 18 carbon atoms, aryl-substituted aliphatic alcohols containing 1 to 2 carbon atoms in the alkyl moiety, cyclohexanol, and pentamethyldisiloxanemethanol, and from ½ to 40 parts by weight of a polyfunctional ester of the group consisting of polyacrylic esters and polymethacrylic esters of polyhydric aliphatic alcohols containing 2 to 8 carbon atoms and polyacrylic esters and polymethacrylic esters of polyglycols.

11. A preparation comprising solid and liquid components packaged together in separate containers and capable upon mixing and heating of reacting to form a resinous composition suitable for forming a soft and flexible element of a prosthetic appliance, said solid component comprising from 10 to 100 parts by weight of a finely granular copolymer of vinyl stearate and vinyl acetate wherein the vinyl stearate moiety constitutes 15% to 50% by weight of the copolymer intimately blended with from 0.1 to 2 parts by weight of a catalyst for free radical polymerization selected from the group consisting of peroxides and azo compounds, and said liquid component being a solution containing from ½ to 90 parts by weight of a monofunctional ester of the group consisting of acrylates and methacrylates of alcohols of the group consisting of aliphatic alcohols containing 1 to 18 carbon atoms, aryl-substituted aliphatic alcohols containing 1 to 2 carbon atoms in the alkyl moiety, cyclohexanol, and pentamethyldisiloxanemethanol, and from ½ to 40 parts by weight of a polyfunctional ester of the group consisting of polyacrylic esters and polymethacrylic esters of polyhydric aliphatic alcohols containing 2 to 8 carbon atoms and polyacrylic esters and polymethacrylic esters of polyglycols.

12. A preparation according to claim 11, in which the vinyl stearate moiety of the copolymer constitutes about 30% by weight thereof.

13. A preparation according to claim 11, in which the catalyst blended with the copolymer is benzoyl peroxide.

14. A preparation according to claim 11, in which the monofunctional ester is pentamethyldisiloxanemethyl methacrylate.

15. A preparation according to claim 11, in which the polyfunctional ester is ethyleneglycol dimethacrylate.

16. A preparation according to claim 11, in which the copolymer granules are blended and coated with a dry pulverulent anti-agglomerant.

17. A preparation according to claim 11, in which the copolymer granules are blended and coated with a colored dry pigment.

18. A preparation according to claim 11, in which a polymerization inhibitor is dissolved in the ester solution.

19. A prosthetic appliance comprising a soft and flexible resinous synthetic element made of a polymerization product of a mixture comprising (1) from 10 to 100 parts by weight of a copolymer of vinyl stearate and vinyl acetate wherein the vinyl stearate moiety constitutes 15% to 50% by weight of the copolymer, (2) from ½ to 90 parts by weight of a monofunctional ester of the group consisting of acrylates and methacrylates of alcohols of the group consisting of aliphatic alcohols containing 1 to 18 carbon atoms, aryl-substituted aliphatic alcohols containing 1 to 2 carbon atoms in the alkyl moiety, cyclohexanol, and pentamethyldisiloxanemethanol, and (3) from ½ to 40 parts by weight of a polyfunctional ester of the group consisting of polyacrylic esters and polymethacrylic esters of polyhydroxy aliphatic alcohols containing 2 to 8 carbon atoms and polyacrylic esters and polymethacrylic esters of polyglycols.

20. A denture having a soft lining comprising a polymerization product of a mixture comprising (1) from 10 to 100 parts by weight of a copolymer of vinyl stearate and vinyl acetate wherein the vinyl stearate moiety constitutes 15% to 50% by weight of the copolymer, (2) from ½ to 90 parts by weight of a monofunctional ester of the group consisting of acrylates and methacrylates of alcohols of the group consisting of aliphatic alcohols containing 1 to 18 carbon atoms, aryl-substituted aliphatic alcohols containing 1 to 2 carbon atoms in the alkyl moiety, cyclohexanol, and pentamethyldisiloxanemethanol, and (3) from ½ to 40 parts by weight of a polyfunctional ester of the group consisting of polyacrylic esters and polymethacrylic esters of polyhydroxy aliphatic alcohols containing 2 to 8 carbon atoms and polyacrylic esters and polymethacrylic esters of polyglycols.

21. A denture having a soft lining comprising a free radical polymerization product of a mixture comprising (1) from 10 to 100 parts by weight of a copolymer of vinyl stearate and vinyl acetate wherein the vinyl stearate moiety constitutes 15% to 50% by weight of the copolymer, (2) ½ to 90 parts by weight pentamethyldisiloxanemethyl methacrylates, and (3) ½ to 40 parts by weight of ethyleneglycol dimethacrylate.

References Cited in the file of this patent

UNITED STATES PATENTS

| | | |
|---|---|---|
| 2,118,864 | Reppe et al. | May 31, 1938 |
| 2,532,502 | Joy | Dec. 5, 1950 |
| 2,569,767 | Knock | Oct. 2, 1951 |
| 2,877,205 | Lal | Mar. 10, 1959 |

OTHER REFERENCES

Flory: "Principles of Polymer Chemistry," pages 31–32, Cornell University Press, Ithaca, New York, 1953.

UNITED STATES PATENT OFFICE
CERTIFICATE OF CORRECTION

Patent No. 3,084,436                                           April 9, 1963

Lawrence Albert Landry

It is hereby certified that error appears in the above numbered patent requiring correction and that the said Letters Patent should read as corrected below.

Column 1, line 26, strike out "the"; lines 69 and 70, for "metharylates" read -- methacrylates --; column 3, line 38, for "polygylcol" read -- polyglycol --; column 6, line 1, strike out the period and insert a comma; column 9, line 45, insert -- Powder: --, as a heading to the left-hand column.

Signed and sealed this 19th day of November 1963.

(SEAL)
Attest:

ERNEST W. SWIDER

Attesting Officer

EDWIN L. REYNOLDS

Acting Commissioner of Patents